United States Patent [19]

Box et al.

[11] Patent Number: 4,859,107
[45] Date of Patent: Aug. 22, 1989

[54] STRUCTURES SUBJECT TO BENDING AND FATIGUE LOADING

[75] Inventors: Robert L. Box, Grange-over-Sands; Peter R. Cottrell, Barrow-in-Furness, both of United Kingdom

[73] Assignee: Vickers Shipbuilding & Engineering Limited, Cumbria, United Kingdom

[21] Appl. No.: 127,870

[22] Filed: Dec. 2, 1987

[51] Int. Cl.$^4$ .............................................. F16T 15/00
[52] U.S. Cl. ...................................... 403/24; 343/709; 403/291; 403/220
[58] Field of Search .................. 403/291, 220, 223, 24, 403/287; 343/709, 710

[56] References Cited

U.S. PATENT DOCUMENTS

| | | | |
|---|---|---|---|
| 3,290,949 | 12/1966 | Samet | 403/291 |
| 3,594,027 | 7/1971 | Ressler et al. | 403/165 |
| 3,988,906 | 11/1976 | Smith | 403/291 |
| 4,349,824 | 9/1982 | Harris | 343/709 |

Primary Examiner—Randolph A. Reese
Assistant Examiner—Carol I. Bordas
Attorney, Agent, or Firm—Pollock, VandeSande & Priddy

[57] ABSTRACT

A structure to be subjected to bending and fatigue loading comprises two components having different stiffness connected together. Deflection of the more flexible component is accommodated by the interposition of an intermediate member of varying flexibility between the components or by providing the less flexible component with a flexible portion to act as a fulcrum for the deflection. The components may be a radar-transparent cover and a mounting therefor for use in a submarine.

10 Claims, 6 Drawing Sheets

STRUCTURES SUBJECT TO BENDING AND FATIGUE LOADING

BACKGROUND OF THE INVENTION

This invention relates to the mounting of structures subject to bending and fatigue loading and more particularly, but not exclusively, is concerned with the mounting of radar-transparent covers (Radomes) over radar antennae on the masts of submarines.

The aforementioned covers are, of course, subject to depth pressure as the vessel submerges and moreover the pressure-cycling which occurs between surface operation and deep diving causes fatigue loading on the radomes and their means of mounting.

SUMMARY OF THE INVENTION

It is an object of the present invention to provide an improved mounting for components such as radar-transparent covers.

More generally, it is a further object of the present invention to connect together two components having different stiffness where the connected components are to be subject to bending moments.

In accordance with one aspect of the present invention, this object is achieved by providing a specific region of flexibility in one of the components to act as a fulcrum for the deflection.

According to this aspect of the present invention there is provided a structure comprising first and second components having higher and lower modulii of elasticity, respectively and secured together wherein the cross-sectional area and form of a portion of the first of said components is such that the product of the second moment of area of said portion and the modulus of elasticity for the first component is approximately equal to or less than the product of the second moment of area and the modulus of elasticity for the second component whereby stress concentrations are reduced when one or both of said components and/or the joint between them are subject to bending.

In accordance with another aspect of the present invention, the object of the invention is achieved by providing an intermediate member between the components along which the flexibility may progressively vary to match the flexibility of the first component to that of the second component.

According to this other aspect of the present invention there is provided a structure comprising first and second components having higher and lower modulii of elasticity respectively and secured together by an intermediate member having:

a first side, fast with said first component, and having a flexibility compatible with the flexibility of said first component and the means of fastening said first side and said first component together;

a second side, fast with said second component, and having a flexibility compatible with the flexibility of said second component and the means of fastening said second side and said second component together; and an intermediate portion, fast with said first and second sides, and having a flexibility between that of said first and second sides or greater than that of either of said first and second sides.

The step changes in the flexibility between the first component and the intermediate member and between the intermediate member and the second component must be compatible with the means used to fasten the intermediate member to the components. For example, if the fastening means is an adhesive (which is weak in tension) the magnitude of the step must be small. However, if the fastening means are bolts, a step of greater magnitude is permissible.

BRIEF DESCRIPTION OF THE DRAWINGS

For a better understanding of the invention and to show how the same may be carried into effect, reference will now be made, by way of example, to the accompanying drawings.

DETAILED DESCRIPTION OF THE INVENTION

Figure 2:
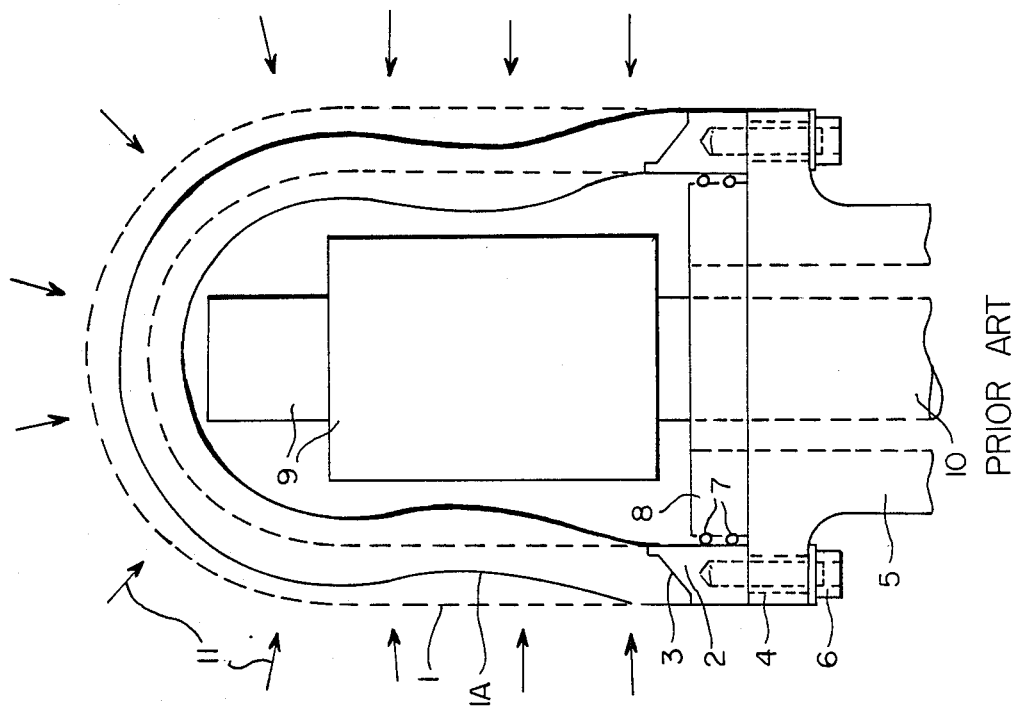
FIG. 2 is a section through the masthead of FIG. 1 showing the effect of depth pressure.

Referring now to the drawings, like components are denoted by like reference numerals in all of the Figures.

Figure 1:
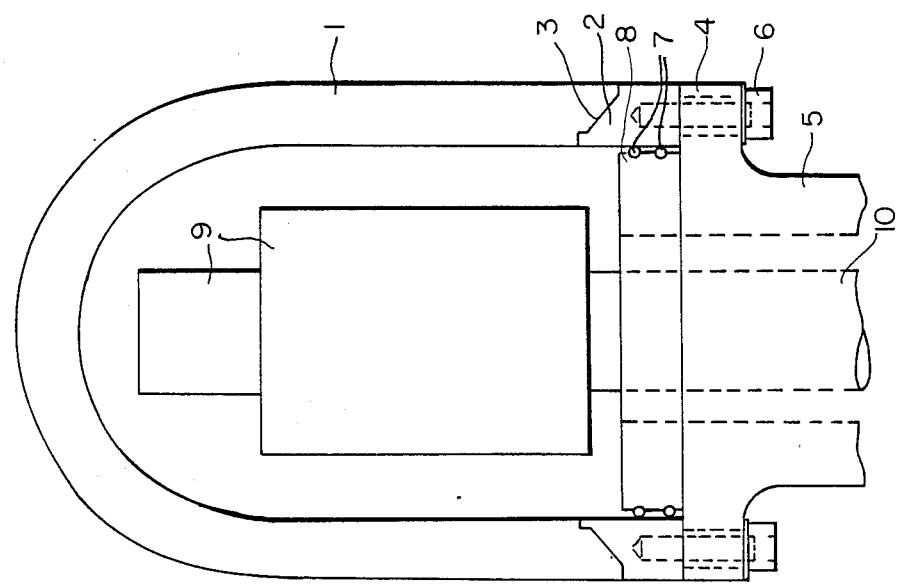
FIG. 1 is a section through a conventional submarine radome masthead exposed to atmospheric pressure.
Figure 3:
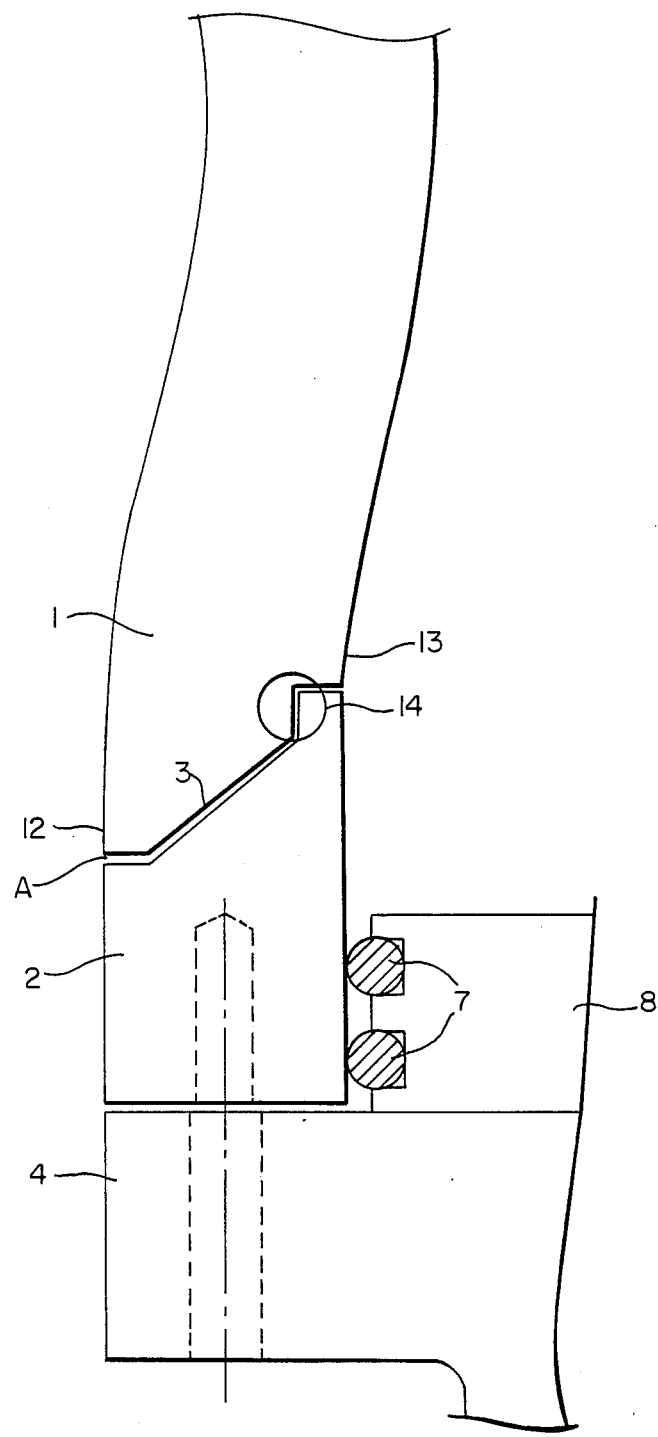
FIG. 3 shows a part of FIG. 2 on an enlarged scale.

FIGS. 1, 2 and 3 show the state of the prior art. A radome 1 is secured to a mounting ring 2 at joint 3 by an adhesive bond. Mounting ring 2 is secured to flange 4, at the upper end of mast 5, by a ring of bolts 6. '0' rings 7 maintain a watertight seal between ring 2 and a spigot 8. Housed within radome 1 are radar antennae 9 supported on member 10. The strongest structure in nature for withstanding external pressure is a sphere and the next strongest is a cylinder. Thus ideally the radome is made in the form of a cylinder with a hemisphere at its upper end as shown in FIG. 1. However, even such a structure will deflect under the influence of external pressure 11. For a submarine such external pressure occurs as the vessel dives in which case the pressure increases linearly with depth; modern submarines can dive very deeply and are thus subject to enormous external pressures and to marked pressure cycling.

FIG. 2 shows how the unpressurized radome 1 (shown dashed for comparison) deflects to assume configuration 1A under external pressure 11. At its lower end, the radome is rigidly secured to ring 2 by the adhesive. This form of mounting is known as 'built in' or 'encastre'. The cylindrical section of the radome is weaker than the hemispherical end and so deflects more. However, the weakest link in the design is the joint 3 between the cylindrical section of radome 1 and ring 2. The modulus of elasticity of the material of radome 1 will ordinarily be of the order of $N \times 10^4$ psi ($N \times 10^9$ N/m$^2$) where $0 < N < 10$ and that of the metal ring 2, flange 4 etc, ill ordinarily be of the order of $N \times 10^6$ psi ($N \times 10^{11}$ N/m$^2$), i.e. the metal is stiffer by around two orders of magnitude. Thus, under a given external pressure, ring 2 will deflect much less than the cylindrical section of radome 1A; this difference is enhanced due to the support given to ring 2 by flange 4 and spigot 8 via bolts 6. The result of this set of conditions is to cause the radome to distort as shown at 1A.

FIG. 3 shows, in an enlarged section, the effects of the encastre loading on ring 2, joint 3 and radome 1. The effect of the flexing moment across joint 3 is to generate tensile forces at the outer surface 12 and compressive forces at the inner surface 13 of the radome. The result is to cause the end of the radome to tend to pivot at a fulcrum 14 somewhere in the region marked by the circle. It is well known that adhesives are at their weakest when in direct tension and that a cyclical tension is particularly harmful. Thus the outer circumference A of the adhesive of joint 3 is the region where failure of the adhesive is most probable. When an incipient crack has formed, it may be propagated by pressure cycling, by the ingress of sea water or other foreign matter, and by lateral forces due to the motion of the submarine in the water, wave slam, etc. Further, the normal operational conditions are greatly exacerbated by the effects of enemy action, e.g. depth charging. There is thus a requirement to increase the reliability which can be placed on joint 3 by reducing the partial loads on the two abutting surfaces.

In supporting mechanical components subject to bending, the ends may be built-in (encastre) at one extreme; or simply supported (pin-jointed) at the other extreme. If the ends are encastre, they are completely constrained, and any bending to which the component is subjected is reacted by fixing moments at the ends. This type of end constraint thus gives rise to large parting forces on the adhesive bond which could cause failure of the type illustrated in FIG. 3. At the other extreme, simply supported ends would not give rise to such forces on the adhesive bond, which would be virtually unstressed in this condition. However, this type of end support is incompatible with a watertight joint. There is thus a need for a linking component which displays properties intermediate between those of these two extremes, to permit the preferred gradual transition between the stiffness of the flange on the submarine mast and the lesser stiffness of the radome itself.

This is achieved in accordance with a first aspect of the invention by adapting the cross-sectional area and form of the ring 2 (i.e. the first component having the higher modulus of elasticity) in such a way to produce a flexible portion wherein the product of the second moment of area of the flexible portion and the modulus of elasticity for the ring 2 is approximately equal to the product of the second moment of area and the modulus of elasticity for the radome i.e. the second component.

As all engineering design involves an element of compromise between the ideal and what can be achieved in practice, the term "approximately equal" is used above. Though it may be theoretically possible to adjust scantlings to give the required dimensions (and hence the desired second moment of area), the fact that only a portion of the first component is 'adapted' means that the mechanical properties of this portion will benefit from the thicker adjacent portions and the radii of corners fairing one portion into another. In practice the aim is to reduce the difference in the products of the modulii of elasticity and second moments of area for the two components to within about 10%.

Preferably the flexible portion of the first component is not concentrated at a single point, but extends over a reasonable distance, so that the stresses due to the additional flexure are suitably spread. Advantageously, all corners in the proximity of the flexible portion are radiused so that they do not act as stress raisers and potential sources of failure. Similarly, the surface of the flexible portion is machined to a smooth finish to minimize the likelihood of stress raisers being present.

The man skilled in the art will be aware of the method of 'Finite Element Analysis' as an appropriate design tool for the calculation of the dimension of the flexible portion. The principles of finite element analysis are described in "The Finite Element Method —A Basic Introduction for Engineers" by Rockey, Evans, Griffiths and Nethercot (Granada Publishing Limited, 1975).

The dimensions of the flexible portion may be further reduced so that the product of the second moment of area of the flexible portion and the modulus of elasticity for the first component is less than the product of the second moment of area and the modulus of elasticity for the second component so that bending occurs preferentially at the flexible portion.

The second aspect of the invention achieves a similar result to the first by the interposition of an intermediate member between the first and second components which has the aforementioned flexibility characteristics. The flexibility of said intermediate portion may vary progressively from said first side to said second side in a manner which does not give rise to stress concentrations.

The intermediate member acts as a means of spreading the length over which differential flexing occurs so that the rate of change of flexing can be kept to an acceptable level compatible with fatigue life in the case of normal pressure cycling, or catastrophic failure limits in the case of shock loadings. The intermediate member may be in two or more parts so as to give a 'layered' form of construction, i.e. if the intermediate member has two parts A and B, the construction would be:

1st Component —Part A —Part B —2nd Component whence $$Tm^3 = \frac{Er}{Em} \cdot Tr^3$$

The values of Em and Er may typically be taken as $12.4 \times 10^4$ and $0.275 \times 10^4$ N/mm$^2$ respectively so that $$Tm^3 = \frac{0.275 \times 10^4}{12.4 \times 10^4} \cdot Tr^3$$

i.e. Tm=0.28 Tr.

Thus by reducing the thickness of the metal Tm at the throat portion 18 to 28% of the radome thickness (Tr), the flexibilities of the thin throat portion 18 and full thickness radome 1 would equate.

If Tm were reduced to 0.25 Tr, i.e. one quarter the thickness, EmIm ErIr so that the flexibility at the throat portion 18 would be greater than that of radome 1. Consequently, under external pressure (FIG. 2), flexing would occur preferentially about a fulcrum F (FIG. 4) in the general region of the throat portion 18 so that the upper section 17 of the ring 2 (which is bonded to radome 1) can flex relative to the lower section of ring 2. The aim is to make the flexibility about fulcrum F equal to, or marginally greater than, that of radome 1 so that, under the effects of external pressure (FIG. 2), flexing would preferentially occur about the fulcrum F. This could be equivalent to a circular "hinge" and would greatly reduce the fixing moments compared to the encastre case. Within normal design constraints, it is possible to design the adhesive joint 3 (FIG. 4) so that bending stresses are almost entirely eliminated. The technique known as 'Finite Element Analysis' is well suited to optimizing the sections of ring 2 to achieve the required mechanical properties.

The overall dimensions of mounting ring 2 in

A combination of the first and second aspects of the invention can be used simultaneously.

Figure 4:
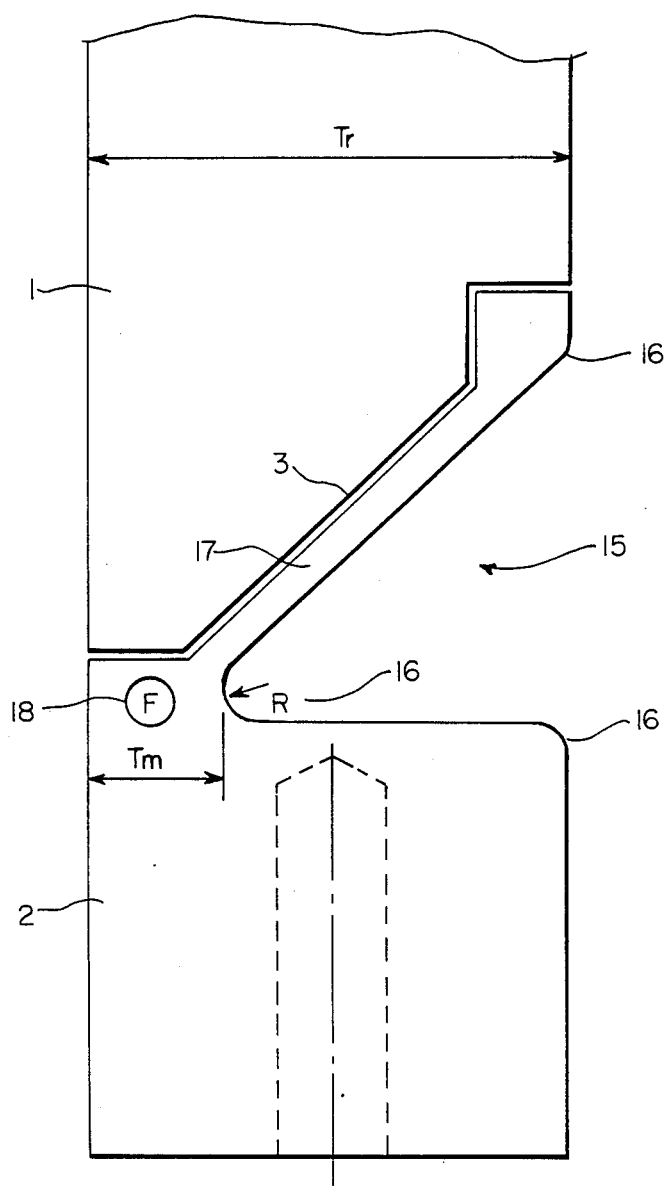
FIG. 4 corresponds to FIG. 3 and shows a part of a masthead in accordance with a first embodiment of the invention.

Referring now to FIG. 4, the mounting ring 2 has been rendered more flexible by the removal of metal from area 15. The metal-removal, e.g. by machining, has been done in such a way as to leave large radii 16 on all corners. The purpose of this is to eliminate sharp corners in critical areas which could act as 'stress raisers'. Metal has been removed from area 15 to leave a section 17 having adequate mechanical properties to meet the requirements of depth pressure and bonding of the radome 1 via joint 3.

The flexibility of a component is a function of the modulus and the geometry of the particular portion of the component under consideration. In the example shown in FIGS. 4–9, the modulus is the 'modulus of elasticity' (E), and the geometry is defined by the 'second moment of area' (I). Thus, the product of E and I may be used as a measure of the flexibility of the components under consideration.

Referring to FIG. 4, the sections of ring 2 and radome 1 may be assumed to be flat plates (even though they are actually rings) for which the formula:

$$I = \left[\frac{BT^3}{12}\right]$$

applies, where B=length and T=thickness of the section. Thus, if subscripts 'm' for metal (2) and 'r' for radome (1), are used, the flexibilities may be equated by:

$$Em.\left[\frac{BT^3}{12}\right]_m = Er.\left[\frac{BT^3}{12}\right]_r$$

This simplifies to $Em\, Tm^3 = Er\, Tr^3$

Figure 7:
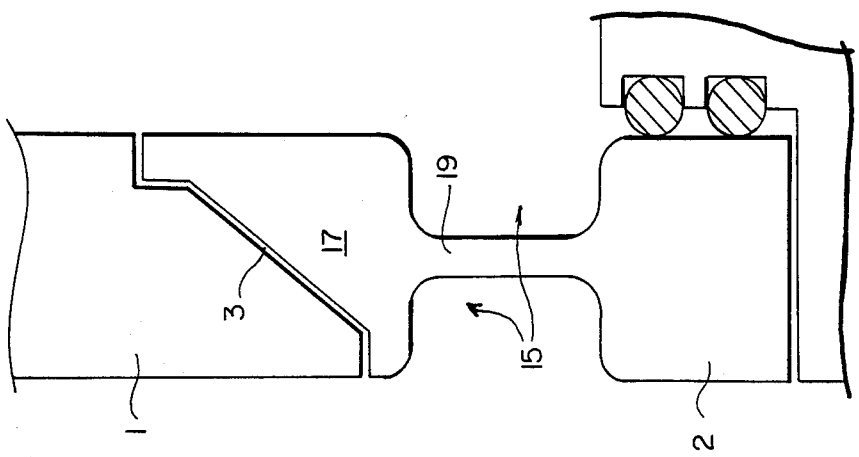
FIGS. 5 to 7 correspond to FIG. 4 and show parts of mastheads in accordance with second, third and fourth embodiments of the invention.
Figure 6:
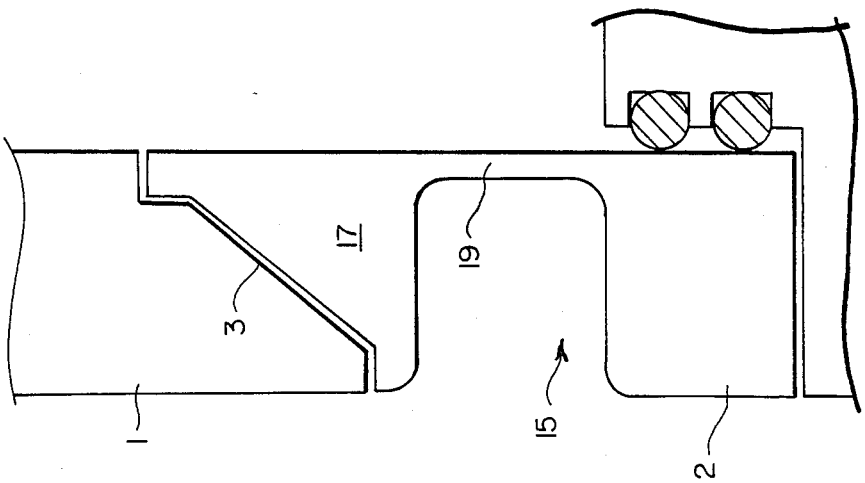
Figure 5:
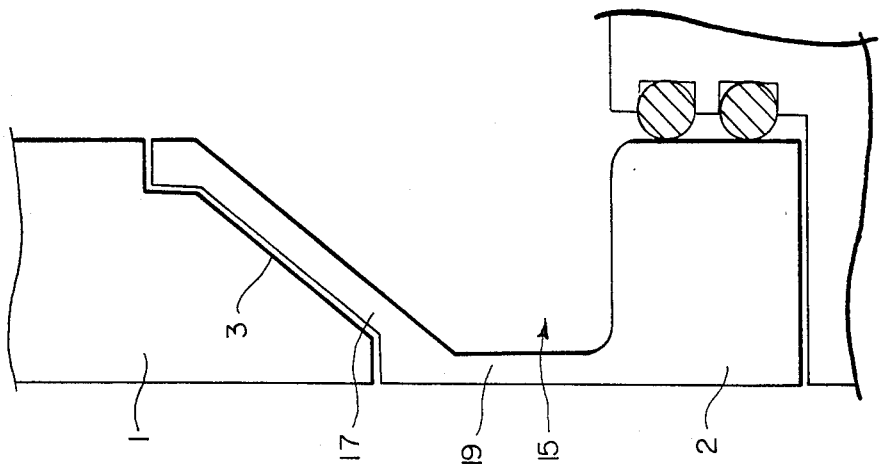

FIG. 4 are the same as those of FIGS. 1, 2 and 3. One possible criticism of the design, as shown in FIG. 4, is that all the flexing could be concentrated in a relatively small volume of metal around fulcrum F. This could cause metal fatigue. This problem can be overcome if the axial length of ring 2 were to be increased. This can be done without obscuring the radar 'window' by lowering flange 4 on mast 5 and/or increasing the thickness of spigot 8 and lengthening member 10. FIGS. 5, 6 and 7 illustrate three preferred embodiments. In each case a 'web' 19 is provided to act as the 'flexible portion'.

The arrangement in FIG. 5 follows closely that in FIG. 4 except that a web 19 is introduced between the upper section 17 and the lower section of mounting ring 2. This effectively changes the position of fulcrum F from a point (FIG. 4) to the whole axial length of web 19, thus spreading the stresses from a small locality over a much longer length. The alloy of ring 2 is chosen such that the web 19 can be machined to a section thin enough to give the required flexibility, e.g. 0.25Tr, yet still possess adequate mechanical strength to resist depth pressure and shock loading.

In FIGS. 6 and 7, the web 19 is located at the inner surface of ring 2 and midway between the inner and outer surfaces, respectively. In both cases, the principle is the same as described in the previous paragraph. In these latter two arrangements, the shape of the upper section 17 of ring 2 is altered to meet the particular requirements as defined by the position of web 19. It will be noted that all corners, in the highly stressed areas adjacent to the web, are machined to give large radii of curvature (16, FIG. 4) so that they do not act as stress raisers.

Figure 8:
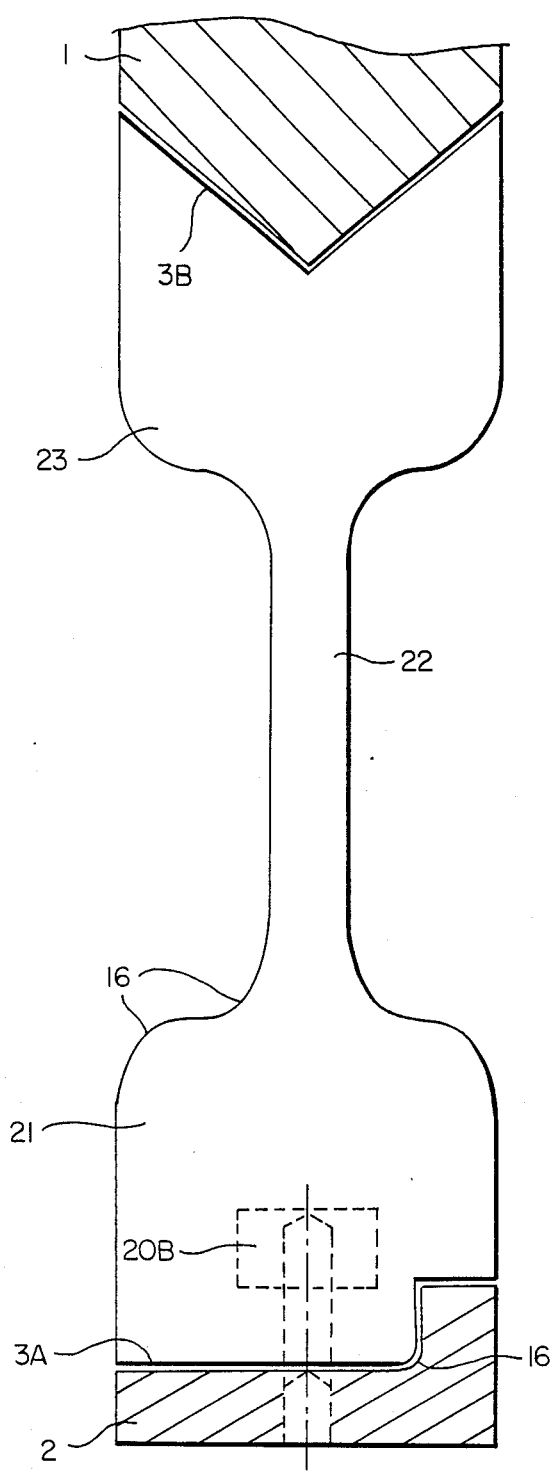
FIG. 8 shows a part of a masthead in accordance with a fifth embodiment of the invention.

FIG. 8 shows an example of the second aspect of the invention wherein an intermediate member 21, 22, is used to join the mounting ring 2 to radome 1. The intermediate member consists of (i) A first side 21 which is fastened to the mounting ring to form joint 3A. The first side 21 has a large section and a flexibility that is compatible with that of mounting ring 2, the structure 4 on which it is mounted, and the fastening means used to form joint 3A (e.g. an adhesive).

(ii) A second side 23 which is fastened to radome 1. The second side 23 has a particular form and size of section to give a flexibility compatible to that of the radome 1 as well as providing for an adequate length and form of joint 3B. A chevron form of joint 3B is shown as being indicative of one of the many configurations which could be used.

(iii) The third part of the member is an intermediate portion in the form of web 22. As can be seen from the Figure, the section of web 22 is much thinner than either sides 21 or 23 and, though it is strong enough to resist depth pressure, it is readily able to flex under external compressive loads, e.g. as shown in FIG. 2. Web 22 thus acts as a form of circular 'hinge' though with the bending spread out over a considerable length of the web, rather than being concentrated at one particular fulcrum. Though a parallel-sided web 22 is shown in FIG. 8, it could equally well be tapered from the first side 21 to the second side 23 to give a progressive change in flexibility or have a value between that of the two sides. Large radius corners 16 are used to avoid stress raising points.

Intermediate member 21–23 could be made of a suitable metallic or non-metallic material. Of the non-metallic materials, glass reinforced plastic (GRP) is suitable. GRP sections may be made by placing sheets of glass fiber matting on a former and impregnating with resin. According to the sequence in which the direction of the fibers are arranged, the flexibility of the final structure may be varied. It is thus possible to construct an intermediate member with one stiff side 21, a less stiff side 23 and a very flexible web 22, even though the two sides 21 and 23 may appear to be of a similar sized section.

Thus, as shown in FIG. 8, first side 21 has a flexibility approximately equal to that of ring 2 so that, when under external pressure, no undue stress is placed on the adhesive of joint 3A. Second side 23 has a flexibility approximately equal to that of radome 1 so that the adhesive of joint 3B would be similarly lowly stressed. Web 22 may be more flexible than either sides 21 or 23 so that it can act as the fulcrum when subjected to external pressure and pressure cycling. A long web 22 is preferable as the bending occurs over a length rather than at a point. The modulus of elasticity for GRP can vary between $0.7$–$2.4 \times 10^4$ N/mm$^2$ depending on the directional layering of the fibers. It is thus quite possible to obtain sections of similar size but widely differing properties in the same GRP component, or a standard size of section along which the flexibility varies.

A further advantage of GRP is that a modified mounting ring 20B could be embedded in first side 21 which, in this case, would have a flat base for bolting to flange 4. An advantage of this form of construction would be to eliminate the adhesive joint at 3A.

Figure 9:
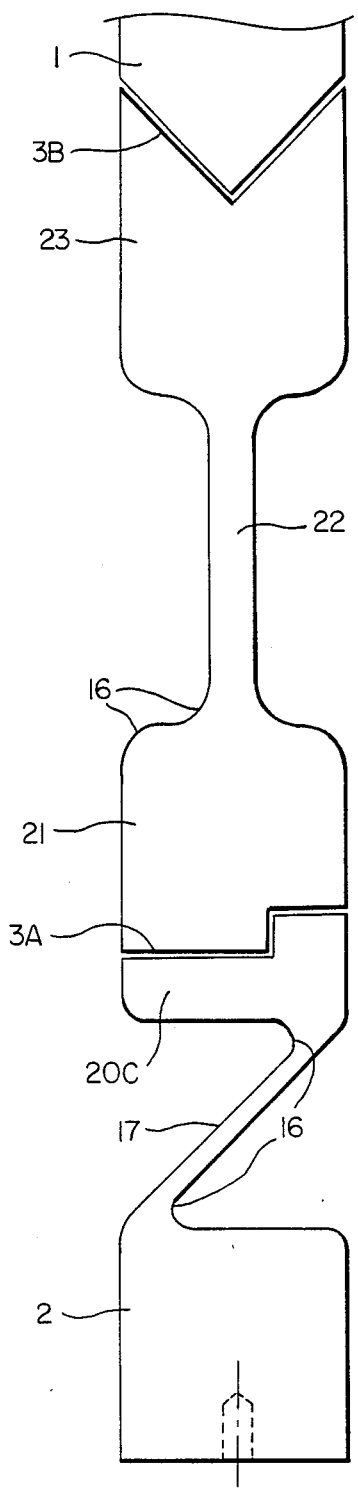
FIG. 9 shows a part of a masthead in accordance with a sixth embodiment of the invention.

FIG. 9 shows how the first and second aspects of the invention can be combined to give a mounting arrangement having even greater flexibility. In this case, ring part 20C and first side 21 of the intermediate member have approximately equal flexibility to minimize bending stresses on the adhesive of joint 3A. Second side 23 of the intermediate member and radome 1 also have approximately equal flexibility to protect joint 3B. The prime flexibility would be provided by dual fulcrums in webs 17 and 22.

The mounting arrangements disclosed herein, whether utilizing one or both aspects of the present invention can be designed to connect together components irrespective of their differences in relative flexibilities. The method of finite element analysis is most suited to the design of the mounting arrangement.

We claim:

1. A structure comprising first and second components having higher and lower modulii of elasticity, respectively, and secured together at a transistion joint wherein the cross-sectional area and form of a portion of the first of said components in said transistion joint is such that the product of the second moment of area of said portion and the modulus of elasticity for the first component is approximately equal to or less than the product of the second moment of area and the modulus of elasticity for the second component, whereby stress concentrations are reduced when one or both of said components and/or the transition joint between them are subject to bending.

2. A structure as claimed in claim 1 wherein said product for the first component is from 90% to 110% of said product for the second component.

3. A structure as claimed in claim 1 wherein said second component is a radome for a submarine and said first component is a mounting for said radome.

4. A structure comprising first and second components having higher and lower modulii of elasticity respectively and secured together by an intermediate member having:
   a first side, fast with said first component, and having a flexibility compatible with the flexibility of said first component and the means of fastening said first side and said first component together;
   a second side, fast with said second component, and having a flexibility compatible with the flexibility of said second component and the means of fastening said second side and said second component together; and
   an intermediate portion, fast with said first and second sides, and having a flexibility between that of said first and second sides or greater than that of either of said first and second sides.

5. A structure as claimed in claim 4 wherein the cross-sectional area and form of a portion of said first component is such that the product of the second moment of area of said portion and the modulus of elasticity for the first component is approximately equal to or less than the product of the second moment of area and the modulus of elasticity for the second component.

6. A structure as claimed in claim 5 wherein said product for the first component is from 90% to 110% of said, product for the second component.

7. A structure as claimed in claim 4 wherein said second component is a radome for a submarine and said first component is a mounting for said radome.

8. A relatively rigid mounting on a submarine mast and a relatively flexible radome secured to the mounting at a transition joint, wherein the cross-sectional area and form of a portion of the mounting at said transition joint are such that the product of the second moment of area of said portion and the modulus of elasticity for the mounting is approximately equal to or less than the product of the second moment of area and the modulus of elasticity for the radome, whereby stress concentrations are reduced when one or both of said radome and mounting or the joint between them are subject to bending.

9. A relatively rigid mounting on a submarine mast and a relatively flexible radome secured to the mounting by an intermediate member comprising:
   a first side, fast with said first mounting and having a flexibility compatible with the flexibility of said mounting and the means of fastening said first side and said mounting together;
   a second side, fast with said radome and having a flexibility compatible with the flexibility of said radome and the means of fastening said second side and said radome together; and,
   an intermediate portion, fast with said first and second sides, and having a flexibility between that of said first and second sides or greater than that of either of said first and second sides.

10. A structure as claimed in claim 9 wherein the cross-sectional area and form of a portion of said first component are such that the product of the second moment of area of said portion and the modulus of elasticity for the first component is approximately equal to or less than the product of the second moment of area and the modulus of elasticity for the second component.

* * * * *